United States Patent [19]

Clark

[11] Patent Number: 5,015,611

[45] Date of Patent: May 14, 1991

[54] WATER REGENERATION OF DEACTIVATED CATALYST

[75] Inventor: Danford E. Clark, Fountain Valley, Calif.

[73] Assignee: Union Oil Company of California, Los Angeles, Calif.

[21] Appl. No.: 486,533

[22] Filed: Feb. 28, 1990

Related U.S. Application Data

[63] Continuation-in-part of Ser. No. 457,554, Dec. 27, 1989, abandoned.

[51] Int. Cl.5 .................. B01J 23/94; B01J 38/48; B01J 38/14; C10G 45/08
[52] U.S. Cl. .................. 502/20; 208/216 R; 502/51; 502/52; 502/517
[58] Field of Search .................. 502/22, 38, 517, 52, 502/51; 208/216 R

[56] References Cited

U.S. PATENT DOCUMENTS

| | | | |
|---|---|---|---|
| 2,552,659 | 5/1951 | Allen | 502/22 |
| 3,076,755 | 2/1963 | Stark et al. | 208/216 |
| 3,839,191 | 10/1974 | Johnson | 502/22 |
| 4,038,209 | 7/1977 | Schoofs | 502/22 |

Primary Examiner—Paul E. Konopka
Attorney, Agent, or Firm—Alan H. Thompson; Gregory F. Wirzbicki

[57] ABSTRACT

A catalyst useful for promoting the conversion of organonitrogen and organosulfur compounds in a hydrocarbon-containing feedstock is regenerated in a method wherein a deactivated catalyst is contacted with a controlled amount of water prior to combustion of sulfur contaminants from the catalyst.

40 Claims, No Drawings

WATER REGENERATION OF DEACTIVATED CATALYST

RELATED APPLICATIONS

This application is a continuation-in-part application of U.S. Pat. No. 457,554, filed Dec. 27, 1989 now abandoned.

BACKGROUND OF THE INVENTION

The present invention is related to regeneration of spent or deactivated catalysts used in hydroprocessing hydrocarbon-containing feedstocks, and, more particularly, to a method for regenerating deactivated catalysts employed in hydrotreating, including hydrodesulfurization and hydrodenitrogenation.

Hydroprocessing of hydrocarbons is usually carried out with a particulate catalyst comprised of a porous refractory oxide support containing catalytically active components such as Group VIB and Group VIII metals, and occasionally phosphorus components. Typically, such catalysts comprising nickel, molybdenum and phosphorus components supported on alumina are employed in hydrotreating hydrocarbon-containing feedstocks so as to reduce high concentrations of sulfur and nitrogen. Although these catalysts are highly useful in reducing sulfur and nitrogen from hydrocarbon-containing feedstocks, the activity of such catalysts is diminished during the course of processing as a result of deposition of carbonaceous(carbon or coke-containing) and/or sulfur residues on the catalyst. Such carbonaceous and sulfur deposits reduces the effective surface area and pore volume of the catalyst and tend to poison the catalyst and plug the pores. During the course of processing, the operating temperature must be increased to compensate for the coking, plugging and poisoning effects, but the higher temperature increases coking and further deactivates the catalyst. Eventually, the required temperature increase to maintain a desired amount of sulfur and nitrogen removal becomes intolerable, and the catalyst is removed, deactivated due to carbonaceous and/or sulfur deposits.

Regeneration of coked and sulfur-contaminated catalysts back to a catalytically active form has been the subject of much investigation, and a number of approaches for regenerating hydroprocessing catalyst by removal of coke and sulfur have been developed. In one regeneration method, the deactivated catalyst is soaked in water for more than one hour prior to removal of the contaminants. However, such an approach (1) does not restore a sufficiently high degree of catalytic activity, (2) results in unacceptable agglomeration of active metals, or (3) results in an unacceptable loss of catalytically active metals, such that catalytic activity of the regenerated catalyst is considerably inferior to the fresh catalyst.

Accordingly, new methods are still being sought for regenerating a catalyst, particularly a hydroprocessing catalyst, such that carbonaceous(coke containing) and sulfur deposits are effectively removed and no appreciable loss of catalytically active metals and substantial recovery of catalytic activity result.

SUMMARY OF THE INVENTION

Briefly, the invention provides a method for regenerating a sulfur and carbonaceous deposit-containing, deactivated catalyst by contacting the deactivated catalyst with a controlled amount of water followed by combustion of substantially all the sulfur and carbonaceous deposits from the catalyst.

In one embodiment of the invention, a deactivated catalyst is first treated with less liquid water than necessary to saturate the deactivated catalyst, then mildly heated to combust or remove a major portion of the sulfur deposits from the deactivated catalyst. Subsequently, the partially treated catalyst is heated to a higher temperature to remove essentially the remainder of the sulfur deposits from the catalyst, and also combust carbonaceous deposits from the catalyst.

In a preferred embodiment, the deactivated catalyst is initially treated, at ordinary temperatures, with an amount of water which is less than the available pore volume, and then heated to an elevated temperature, usually less than about 750° F., until the sulfur deposits on the deactivated catalyst are reduced to less than about 3 weight percent of the deactivated catalyst. Subsequently, the water-treated catalyst is heated to a peak elevated temperature, usually from about 750° F. to about 1050° F., to combust remaining portions of sulfur deposits from the catalyst as well as carbonaceous deposits.

DETAILED DESCRIPTION OF THE INVENTION

In accordance with the present invention, a deactivated catalyst is regenerated by combusting a substantial proportion of sulfur-containing deposits from the catalyst in the presence of a controlled amount of water.

Catalysts which may be regenerated in accordance with the invention usually comprise at least one supported catalytic component. Typically the catalyst contains Group VIB and Group VIII metal components on a porous amorphous support, with the catalytically active metal components usually selected from the group consisting of cobalt, nickel, molybdenum, tungsten, and the oxides and sulfides thereof. Non-noble metal components are preferred and phosphorus components in combination with the above described components is highly preferred. Hydrotreating catalysts are preferred with active metal components comprising nickel, molybdenum, and phosphorus. The support material is usually a porous refractory oxide, but other supports are also useful. In a preferred embodiment, the deactivated catalyst contains a support comprising alumina, including silica-stabilized alumina.

Preferred catalysts for regeneration herein usually contain a combined metal catalytic component weight percent of at least about 18, calculated as the monoatomic elements on a fresh catalyst basis. One preferred hydrotreating catalyst contains greater than about 20 weight percent of Group VIB metal components, calculated as the trioxide on a fresh catalyst basis. Another preferred hydroprocessing catalyst contains greater than about 19 weight percent of molybdenum components, calculated as $MoO_3$, at least about 1 weight percent of nickel components, calculated as NiO, and at least about 0.1 weight percent of phosphorus components, calculated as P, on an alumina-containing support. A more preferred hydrotreating catalyst contains about 20 to about 30 weight percent of the Group VIB metal component (trioxide), about 1 to about 8 weight percent of Group VIII metal components (monoxide) and about 0.1 to about 5 weight percent of phosphorus (P) on a gamma-alumina-containing support. A highly preferred catalyst contains more than about 23 weight percent of molybdenum trioxide, greater than about 2 weight percent of nickel oxide and greater than about 3 weight percent of phosphorus (P).

During the course of processing a hydrocarbon-containing oil, such described catalysts deactivate by accumulations of carbonaceous and sulfur deposits which are responsible for reducing the total available pore volume of the catalyst. Also, the surface area and crushing strength of the catalyst decrease during processing of the hydrocarbon-containing feedstock. The method of the invention is most often used to regenerate deactivated hydrotreating catalysts that usually have an average crushing strength greater than 5 lbs/⅛ inch length of catalyst particulate, have lost a substantial amount of surface area, and ordinarily contain greater than 5 weight percent, and often greater than 10 weight percent of sulfur deposits, at least 1.5 weight percent and usually about 2 to about 20 weight percent of carbonaceous deposits, or combinations thereof. Relative amounts of carbonaceous and sulfur deposits found on the deactivated catalyst may vary, depending upon their use in a particular reactor unit. Although the method of the invention can be used to regenerate a deactivated catalyst which has lost as little as 10 or 20 percent of its catalytic activity(based upon the fresh stabilized catalytic activity during the initial 10 days of operation), the typically regenerated catalyst by the method of the invention has lost at least about 50 percent of its catalytic activity, and preferably at least about 80 percent of its activity.

After removal from a reactor vessel, the deactivated catalyst particles are optionally precleaned with an organic solvent and even hydrogen gas to remove contaminating surface oils prior to regeneration. For precleaning, any of a number of organic solvents are effective, as for example, hydrocarbons comprising aliphatics, aromatics, cyclo-paraffins, or mixtures of theses, with those solvents boiling below about 500 F. being preferred. Examples of suitable organic solvents include decane, benzene, toluene, xylene, cyclohexane, tetralin, as well as cracked naphtha.

In the method of the invention, sulfur-containing and carbonaceous (coke) deposits are removed, primarily by combustion, from the deactivated catalyst which is previously treated with water. The deactivated catalyst is initially contacted with an amount of water which is insufficient to saturate the deactivated catalyst. Such an amount is less than the total available pore volume of the deactivated catalyst. Typically, the water contacting the deactivated catalyst is about 0.01 to less than about 30 weight percent, preferably about 0.5 to about 20 weight percent, and most preferably about 3 to about 17 weight percent of the deactivated catalyst. In terms of the available pore volume, the amount of water contacting the deactivated catalyst is about 5 to about 80 percent of the total available pore volume of the deactivated catalyst.

In contrast to conventional methods wherein the deactivated catalyst is soaked with water(i.e. the deactivated catalyst is saturated and the amount of water contacting the deactivated catalyst is at least the total available pore volume), in the method of the invention the deactivated catalyst is contacted with liquid water in dispersed form, such as a spray, mist, fog, and the like, at ordinary room temperatures(e.g. ambient temperatures) usually in the range from above 0° F. to about 210° F. under normal atmospheric conditions. Whereas conventional methods may water soak the deactivated catalyst for more than one hour prior to combusting any sulfur and/or carbonaceous deposits from the catalyst, in the method of the invention the deactivated catalyst is contacted with water, preferably for less than about one half hour prior to the water-treated catalyst being contacted with a free-oxygen containing gas at an elevated temperature to combust sulfur deposits from the catalyst.

After being contacted by water, the water-treated deactivated catalyst is contacted with a free-oxygen containing gas at an elevated temperature for a time sufficient to concurrently remove a portion of sulfur deposits from the deactivated catalyst, without combustion of carbonaceous deposits from the deactivated. A portion of the carbonaceous deposits contained on the deactivated catalyst are removed by combustion at an elevated temperature which is higher than the initial sulfur-combusting temperature. Such elevated temperatures are maintained for a time sufficient to remove enough sulfur and carbonaceous deposits from the deactivated catalyst to restore the desired catalytic activity relative to the original fresh catalyst. The free-oxygen-containing gas typically has a free oxygen content in the range from about 0.1 to about 25 volume percent, for example air or a reduced oxygen-containing atmosphere relative to air, and ordinarily the elevated temperature is greater than about 300° F. and usually less than about 1050° F. The free oxygen-containing gas preferably contains a free oxygen content in the range from about 0.1 to 13 volume percent. The temperature can be gradually increased by intervals ranging from 50° F. to about 200° F. with holding periods ranging from 0.01 hours to about 2 hours until the temperature reaches a sulfur-combusting temperature. The elevated temperature is frequently held at an intermediate temperature above 400° F., and preferably in the range from about 625° F. to 750° F., for a time sufficient to remove a substantial portion of sulfur deposits from the deactivated catalyst, and usually to remove enough sulfur deposits from the deactivated catalyst to produce a catalyst having less than about 4.5 weight percent, and preferably less than about 3 weight percent of sulfur, calculated as S, from the deactivated catalyst. The portion of sulfur deposits initially removed from the water-treated deactivated catalyst is more than 5 percent, by weight, of the total sulfur contained on the deactivated catalyst freshly removed from the reactor vessel. Usually after a major portion of the sulfur deposits have been removed from the deactivated catalyst at the intermediate temperature, the elevated temperature is further increased to a higher temperature at which the carbonaceous deposits are removed from the deactivated catalyst to produce a regenerated catalyst. This higher temperature at which at least a portion of carbonaceous deposits are combusted(oxidized) from the deactivated catalyst is ordinarily greater than about 550° F. on the surface of the catalyst. The higher temperature can reach a "peak temperature" wherein a substantial portion of the carbonaceous deposits on the deactivated catalyst are time-efficiently combusted from the catalyst, yet no uncontrolled or runaway combustion results. The higher temperature is such as to impart a temperature on the surface of the deactivated catalyst in the range from about 650° F. to about 1000° F.(and typically above 700° F.) even though the surrounding temperature of the free-oxygen-containing gas atmosphere may reach as high as about 1050° F. Typically the temperature on the surface of the catalyst is determined by catalyst bed temperature sensing devices, such as in-bed thermocouples or pyrometers. At the elevated temperature, particularly at the higher temperatures in the range, the surface temperature of the deactivated catalyst must be controlled to prevent excessive agglomeration of the catalytically active metal components supported on the catalyst which, in turn, causes diminished restoration of catalytic activity. Furthermore, the higher elevated temperature must be maintained below a temperature at which the support is ruptured.

The regenerated catalyst produced by the method of the invention usually contains less than about 1, and commonly in the range from about 0.01 to about 1 weight percent of carbonaceous deposits, calculated as C, on a fresh catalyst basis. The regenerated catalyst often contains about 0.1 to about 0.5 and more often from about 0.1 to about 0.3 weight percent of carbonaceous deposits remaining on the catalyst. The amount of sulfur deposits remaining on the regenerated catalyst is usually less than about 4.5 weight percent and often less than about 3 weight percent, calculated as S on a fresh catalyst basis; however, in most cases the sulfur on the catalyst is reduced to about 0.01 to about 1 weight percent and preferably less than about 0.3 weight percent.

Catalysts regenerated by the method of the invention may have up to 100 percent of their original activity restored depending upon the particular modification chosen and/or the particular use intended when returned to service. The regenerated catalyst will usually have at least 50 percent, preferably at least 80 percent and most preferably greater than 90 percent of its original fresh catalyst activity. Also, the activity of a regenerated catalyst, if not 100 percent restored for its original use, may be acceptable for another purpose. For example, the regenerated hydrotreating catalyst disclosed herein, previously utilized in a process to primarily remove nitrogen from a gas oil or fluid cracking pre-treatment feedstock, may be employed in a similar process emphasizing sulfur or contaminant metals removal.

A feature of the invention is that essentially no significant loss of catalytic metal components from the deactivated catalyst results. Such a result is unusual in light of relatively high concentrations of the catalytic metal components contained on the support in combination with the relatively high combustion temperatures. In general, less than about 5, and preferably less than about 3, and most preferably less than about 1 weight percent of the combined supported catalytic components are lost during regeneration from the deactivated catalyst (calculated as the monoatomic element on a fresh catalyst basis). For instance, a deactivated catalyst containing at least about 18 weight percent of catalytic components, calculated as the monoatomic element on the fresh catalyst basis, is regenerated by the method of the invention and the product catalyst exhibits catalytic component losses from the fresh catalyst of less than about 3 weight percent and often less than about 2 weight percent. With respect to Group VIB metal components, particularly molybdenum, a product hydrotreating catalyst catalyst exhibits losses from the fresh catalyst of less than about one weight percent (calculated as the trioxide). Although the invention is not bound by any theory, it is believed that the amount of water contacting the catalytic metal components is enough to mobilize such components to, at least in part, redistribute them on the surface of the support and yet not enough water to dissolve and wash away any or a significant portion of the components. Such redistributions are believed, at least in part, to be responsible for restoration of catalytic activity.

Physical properties of a preferred regenerated catalyst typically include a total pore volume of about 0.20 to about 1.0 cc/gram, and preferably about 0.20 to about 0.60 cc/gram and most preferably about 0.25 to about 0.5 cc/gram and a surface area greater than about 100 m$^2$/ gram, preferably greater than about 100 m$^2$/gram, preferably greater than about 150 m$^2$/gram and most preferably between about 175 and 350 m$^2$/gram with both properties determined by the B.E.T. method. Further the regenerated catalyst generally has less than about 0.1 cc/gram, preferably less than 0.08 cc/gram and most preferably less than 0.06 cc/gram in pores of diameter greater than about 100 angstroms. Moreover, the regenerated catalyst has a pore size distribution including at leasts about 50 percent of the total pore volume in pores of diameters from about 50 to about 300 angstroms.

A highly preferred regenerated catalyst of the invention having nickel and molybdenum metals in the oxide forms contains about 1 to about 16 weight percent of nickel component, calculated as NiO, from about 22 to about 28 weight percent of molybdenum components, calculated as MoO$_3$, and about 1 to about 6 weight percent of phosphorus components, calculated as P, on a support containing gamma alumina. This catalyst has a surface area from about 150 m$^2$/gram to about 300 m$^2$/gram, an average pore diameter from about 75 to about 85 angstroms, and a pore size distribution wherein at least about 70 percent of the pore volume is in pores of diameter in the range from about 20 angstroms above to about 20 angstroms below the average pore diameter and less than about 0.06 cc/gram of the total pore volume in pores of diameter greater than 100 angstroms. It is highly preferred that the catalyst contain between about 16 and about 24 percent of its total pore volume in pores of diameter less than 70 angstroms. Such a regenerated catalyst also contains about 0.1 to about 0.3 weight percent of sulfur deposits, calculated as S, and about 0.01 to about 0.05 weight percent of carbonaceous deposits, calculated as C.

A preferred regenerated catalyst by the process of the invention is activated in accordance with methods suited to hydroprocess a hydrocarbon oil. Most of the regenerated catalysts used in a hydroprocess are more active, sometimes even far more active, in a sulfide form than in the oxide form in which they are generally prepared. Accordingly, the catalyst used herein may be sulfided prior to use by any known method (in which case the procedure is termed "presulfiding"), for example, by passing a sulfiding agent over/on the catalyst prepared in the calcined form. Temperatures between 300° and 700° F. and gaseous space velocities between about 140 and 500 v/v/hr are generally employed, and this treatment is usually continued for at least about two hours. A mixture of hydrogen and one or more components selected from the group consisting of sulfur vapor and sulfur compounds (e.g., lower molecular weight thiols, organic sulfides, and especially H$_2$S) is suitable for presulfiding. Generally speaking, the relative proportion of sulfiding compounds in the presulfiding mixture is not critical, with any proportion of sulfur ranging between 0.01 and 15 percent by volume, calculated as S, being adequate. Also, liquid sulfiding agents, such as dimethyl disulfide and the like, may be used for presulfiding.

If a preferred regenerated catalyst is to be used in a sulfide form, it is preferred that presulfiding procedure be employed. However, since hydroprocessing can be employed to upgrade sulfur-containing hydrocarbons (i.e., hydrodesulfurization), one may, as an alternative, accomplish the sulfiding in situ with sulfur-containing hydrocarbon oils, particularly those containing about 1.0 weight percent or more of sulfur, under hydroprocessing conditions.

The regenerated catalyst may be employed as either a fixed, ebullating, slurried or fluidized bed (but most usually a fixed bed) of particulates in a suitable reactor vessel wherein the hydrocarbon oil to be treated is introduced and subjected to hydroprocessing conditions including an elevated total pressure, temperature, and hydrogen partial pressure. Under such conditions, the hydrocarbon oil and catalyst are subjected to a hydrogen partial pressure usually in the range from about 100 to about 4,000 p.s.i.g. at a space velocity usually in the range from about 0.05 to about 20 LHSV so as to effect the desired degree of hydroprocessing, as for example, desulfurization and/or denitrogenation.

Contemplated for treatment by the process employing the regenerated catalyst are all liquid hydrocarbon-containing feedstocks. Usually the feedstocks are relatively high boiling hydrocarbon-containing oils including crude petroleum oils and synthetic crudes. Among the typical oils contemplated are top crudes, vacuum and atmospheric residual fractions, light and heavy atmospheric and vacuum distillate oils, deasphalted oils, shale oils, and oils from bituminous sands, coal compositions and the like. For use herein, typical hydrocarbon oils, or fixtures thereof, may contain at least about 10 volume percent of components normally boiling above about 1000° F. and in some cases, at least 20 volume percent.

Generally, a substantial proportion (i.e., at least about 90 volume percent) of hydrocarbon feeds such as gas oils and the like boil at a temperature less than about 1100° F., preferably less than about 1050° F., and usually boil entirely within the range of about 100° F. to about 1100° F., and most frequently in the range from about 400° F. to about 1100° F.

Although virtually any high boiling hydrocarbon feedstock may be treated by hydroprocessing with the regenerated catalyst of the invention, the process is particularly suited to treating (1) gas oils, and (2) heavy residual fractions, especially the treated atmospheric and vacuum residuum oils containing less than about 25 ppmw, preferably less than 5 ppmw and most preferably less than 3 ppmw of contaminant metals (vanadium, nickel, and the like). Sulfur is usually present in such oils in a proportion exceeding 0.1 weight percent and often exceeding 1.0 weight percent; however, a particular preferred proportion is about 0.1 to about 0.5 weight percent. The feedstock contains undesirable proportions of nitrogen, usually in a concentration greater than about 2 ppmw and often between about 2 ppmw and 500 ppmw. Ordinarily the feedstock contains less than 200 ppmw of nickel and vanadium contaminant metals, calculated as Ni plus V, with preferred feedstocks containing less than 20 ppmw and most preferably less than 5 ppmw of said materials. Typical feedstocks include those having a API gravity between 6 and 30. The feedstock may contain waxy components, e.g., n-paraffins and slightly-branched paraffins, and thus have a high pour point, e.g., at least about 30° F.

In the hydroprocessing of a hydrocarbon-containing oil, the regenerated catalyst is usually maintained in a hydroprocessing reactor as a fixed bed with the feedstock passing downwardly once therethrough. In some instances, one or more additional reactors may be added to the single reactor, either in series or parallel. If the feedstock is unusually high in organometallic compounds, it may be pretreated, integrally or separately, using a hydrodemetallation catalyst and particularly, a hydrodemetallation catalyst having a substantial amount of pore volume in pores of diameter greater than the average pore volume of the preferred regenerated catalyst.

Typical hydroprocessing conditions that are suitable for hydrodenitrogenation, hydrodesulfurization, or that yield more than about 10 volume percent conversion of the oil fraction boiling above 1000° F. to liquid products boiling at or below 1000° F. are shown in the following Table I:

TABLE I

| Operating Conditions | Suitable Range | Preferred Range |
|---|---|---|
| Temperature, °F. | 500–900 | 600–850 |
| Hydrogen Pressure, p.s.i.g. | 200–4,000 | 1,500–2,500 |
| Space Velocity, LHSV | 0.05–3.0 | 0.1–1.5 |
| Hydrogen Recyle Rate, scf/bbl | 500–15,000 | 1,000–10,000 |

Generally, the hydrogen partial pressure maintained during hydroprocessing is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

The hydroprocess catalyzed by a preferred regenerated catalyst may include either serial or simultaneous desulfurization and denitrogenation of a feedstock. Simultaneous desulfurization, denitrogenation and heavy component (1000° F. plus components) conversion, as used herein, involves contacting a hydrocarbon oil feedstock with the particulate catalyst disclosed herein under conditions effecting (1) a lower sulfur and nitrogen content in the effluent and/or (2) a higher percentage of liquid products boiling at or below 1000° F. in the effluent as compared to the feedstock. Serial desulfurization and denitrogenation of a feedstock by contact with the regenerated catalyst involves removing sulfur and nitrogen from the feedstock either prior to or after contact of the feedstock with a catalyst effective for removing a substantial proportion of contaminant metals from the feed. Comprises a combined hydrodemetallation, hydrodesulfurization and hydrodenitrogenation reaction zone wherein the regenerated catalyst is located in a downstream portion of a fixed bed relative to an upstream catalyst bed portion containing a demetallation catalyst having an average pore diameter of at least 30 angstroms greater than that of the regenerated catalyst.

The invention is further illustrated by the following example which is illustrative of specific modes of practicing the invention and are not intended as limiting the scope of the invention defined by the appended claims.

EXAMPLE

A hydroprocessing catalyst is prepared in a similar manner as described in Example 1 of U.S. Pat. No. 4,879,265, except no citric acid is used and a finished fresh catalyst contains 25.0 weight percent of molybdenum components, calculated as $MoO_3$, 4.03 weight percent of nickel components, calculated as NiO, and 3.20 weight percent of phosphorus components, calculated as P, on a support comprising alumina. The catalyst has a crushing strength of greater than 10 lbs/⅛ inch length, a pore volume of 0.34 ml/gram, and a surface area of 170 $m^2$/gram.

The catalyst is used to hydrodesulfurize and hydrodenitrogenate the Vacuum Gas Oil feedstock identified in Table III over an extended period of time. The catalyst is heavily deactivated with coke and sulfur, and as a result, the catalyst has only about 10 percent of the activity of fresh catalyst. As determined by emission spectroscopy techniques, the deactivated catalyst contains 4.5 weight percent of coke deposits, calculated as C, and 7.4 weight percent of sulfur deposits, calculated as S. On a fresh catalyst calculation basis, the catalyst contains 7.5 weight percent of sulfur and 5.1 weight percent of coke.

The deactivated catalyst is divided into five portions designated as Catalysts A through E, inclusive. Catalysts C, D, and E are regenerated by the method of the invention and Catalysts A and B by other methods. In the method of the invention, the deactivated catalyst C is sprayed under conditions of room temperature and normal atmospheric pressure with sufficient water such that 10 weight percent of the catalyst is contacted with water. The water-treated catalyst is heated in a mixture of gases containing nitrogen and one volume percent of free oxygen gas from room temperature to 800° F. over approximately 8 hours at 100° F./hour. During the course of the rise in temperature, a substantial portion of the sulfur deposits are first combusted(oxidized) from the catalyst prior to any combustion of carbonaceous deposits from the catalyst. The temperature is held at 800° F. until the carbonaceous and sulfur deposits are combusted from the catalyst until less than 0.05 weight percent of carbonaceous deposits remain on the catalyst. Deactivated catalyst D and E are regenerated in the same manner as catalyst C, except the deactivated catalysts are contacted with 5 and 15 weight percent of water, respectively. The weight percent of remaining sulfur, calculated as S, the resultant surface area and resultant pore volume of catalysts C, D and E are summarized in Table II. Deactivated catalyst A is regenerated in the same manner as catalysts C, D and E, except the deactivated catalyst is not contacted with water. Also, deactivated catalyst B is regenerated in the same manner as catalysts C, D and E, except the deactivated catalyst is soaked with water for 1 hour and 10 minutes prior to being heated to 800° F. The weight percent of remaining sulfur, the resultant surface area and resultant pore volume of catalysts A and B are summarized in Table II.

TABLE II

| Catalyst, water wt. % | Sulfur | surface area, $m^2$/gm | pore vol. cc/gm |
|---|---|---|---|
| A, no water | 0.22 | 152 | 0.33 |
| B, soak (1.17 hr) | 0.12 | 170 | 0.37 |
| C, 10 wt. % water | 0.21 | 154 | 0.33 |
| D, 5 wt. % water | 0.22 | 149 | 0.32 |
| E, 15 wt. % water | 0.23 | 154 | 0.32 |

The data in Table II indicates the catalysts regenerated by the method of the invention contain less than 0.3 weight percent of remaining sulfur. The catalyst prepared with the water soaking step has a resultant pore volume which is at least about 0.03 cc/gm greater than that of the fresh catalyst(i.e. 0.34 cc/g) thus indicating the catalytic active metals, at least in part, have been removed from the catalyst. The surface area of catalyst B is at least 15 $m^2$/gram more than that of the catalysts prepared by the method of the invention, further indicating catalytic metal loss.

An activity test is conducted by contacting the catalysts A through E, in separate runs with the feedstock identified in Table III under hydroprocessing conditions. However, at the outset of each run, the respective catalysts are presulfided by contact for about 16 to 20 hours with a gas consisting of 90 volume percent $H_2$ and 10 volume percent $H_2S$ flowing at 4.4 SCFM (one atmosphere pressure). The temperature during the presulfiding is initially at room temperature, is increased gradually until 700° F. is reached, and then lowered to 550° F., at which time the catalyst is contacted with the feedstock.

TABLE III

| Feedstock Properties | |
|---|---|
| Feed Description | Vacuum Gas Oil |
| Gravity, °API | 23.5 |
| Sulfur, wt. % | 1.8 |
| Total Nitrogen, wt. % | 0.300 |
| Basic Nitrogen, wt. % | 0.124 |
| ASTM D-1160, Vol. % | Distillation, °F. |
| IBP/5 | 234/435 |
| 10/20 | 470/500 |
| 30/40 | 555/586 |
| 50/60 | 617/644 |
| 70/80 | 671/699 |
| 90/95 | 732/754 |
| End Point | 787 |

A portion of the feedstock is passed downwardly through a reactor vessel and contacted in separate runs with each catalyst in a single-stage, single-pass system with once-through hydrogen. The operating conditions during each run are summarized as follows: 1,400 p.s.i.g. total pressure, 2.0 LHSV, a hydrogen rate of 6,000 SCF/bbl, and an initial temperature of 720° F.

Catalyst X employed at 60 hours in the reference hydroprocess is given an arbitrary activity of 100. Relative activities of Catalyst C, D and E, regenerated by the method of the invention, of Catalysts A and B, regenerated by other methods, and of fresh reference Catalyst X for denitrogenation and desulfurization are determined by calculation and tabulated in comparison to Catalyst X in Table IV. These denitrogenation activity determinations are based on a comparison of the reaction rates for denitrogenation obtained from the data of the experiment according to the following standard equation which assumes first order kinetics for denitrogenation:

$$\text{Relative Volume Denitrogenation Activity} = \frac{\ln[C_f/C_p]}{\ln[C_{fr}/C_{pr}]} \times 100$$

where $C_{fr}$ and $C_{pr}$ are the respective concentrations of nitrogen in the feed and product obtained with the catalyst employed in the reference process and $C_f$ and $C_p$ are the respective concentrations of nitrogen in the feed and product obtained with a catalyst being compared to the reference. These desulfurization activity determinations are based on a comparison of the reaction rates for desulfurization obtained from the data of the experiment according to the following standard equation which assumes one and one-half order kinetics for desulfurization:

$$\text{Relative Desulfurization Activity} = \frac{(1/S_p)^{\frac{1}{2}} - (1/S_f)^{\frac{1}{2}}}{(1/S_{pr})^{\frac{1}{2}} - (1/S_{fr})^{\frac{1}{2}}} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

The relative volume activity (RVA) for total nitrogen and sulfur conversion obtained for each catalyst is set forth in Table IV. The data in Table IV indicate that Catalyst C, D, and E prepared by the method of this invention are consistently more active for basic and total nitrogen conversion and for sulfur conversion than Catalyst A and B of the prior art.

TABLE IV

| Catalyst Water wt. % | RVA for basic nit., $N_{(b)}$ | for total nit., $N_{(t)}$ | for sulfur, S |
|---|---|---|---|
| Fresh | 100 | 100 | 100 |
| A, 0 | 79 | 81 | 84 |
| B, Soak | 80 | 70 | 61 |
| C, 10% | 88 | 90 | 87 |
| D, 5% | 86 | 93 | 109 |
| E, 15% | 90 | 94 | 99 |

Although the invention has been described in conjunction with a preferred embodiment and Examples thereof, it is evident that many alternatives, variations, and modifications of the invention are possible. It is intended to include within the invention all such alternatives, variations, and modifications as fall within the spirit and scope of the appended claims.

I claim:

1. A method for regenerating a deactivated hydroprocessing catalyst by contacting the deactivated catalyst with an amount of water insufficient to saturate the deactivated catalyst but greater than about 0.5 weight percent of said deactivated catalyst and, subsequently, contacting the deactivated catalyst with free oxygen-containing gas at an elevated temperature in the range from about 300° F. to about 1050° F. for a time sufficient to remove a portion of sulfur deposits from said deactivated catalyst.

2. The method defined in claim 1 wherein said deactivated catalyst further comprises carbonaceous deposits and at least a portion of said carbonaceous deposits are combusted from said deactivated catalyst at a temperature higher than said elevated temperature at which at least 5 percent, by weight, of said sulfur deposits are removed from said deactivated catalyst.

3. The method defined in claim 2 wherein said deactivated catalyst is contacted in step (1) with liquid water and in step (2) said elevated temperature is less than about 1050° F.

4. The method defined in claim 2 wherein a major portion of said carbonaceous deposits contained on said deactivated catalyst are not combusted from said catalyst until at least a major portion of said sulfur is combusted from said catalyst.

5. The method defined in claim 2 wherein after said deactivated catalyst is contacted with at least a portion of said free oxygen-containing gas at said elevated temperature said sulfur deposits remaining on a regenerated product catalyst are less than about 3 weight percent and said carbonaceous deposits remaining on said regenerated product catalyst are less than about 0.5 weight percent.

6. The method defined in claim 1 wherein said water comprises greater than about 0.5 to less than about 30 weight percent of said deactivated catalyst.

7. The method defined in claim 1 wherein said water comprises about 0.5 to about 20 weight percent of said deactivated catalyst.

8. The method defined in claim 1 wherein said water comprises about 3 to about 17 weight percent of said deactivated catalyst.

9. The method defined in claim 1 wherein said water is in dispersed form.

10. The method defined in claim 1 wherein said deactivated catalyst comprises at least one active catalytic component on an amorphous support and, after said deactivated catalyst is contacted with said free oxygen-containing gas at an elevated temperature, said metal component is less agglomerated on said support than the active catalytic component on the same deactivated catalyst which is not contacted with said amount of water.

11. The method defined in claim 10 wherein said elevated temperature and time sufficient to remove said sulfur deposits but insufficient to cause sulfation of said amorphous support.

12. The method defined in claim 1 wherein said elevated temperature is greater than about 400° F. on the surface of the deactivated catalyst.

13. The method defined in claim 1 wherein said free oxygen-containing gas has an free oxygen content from about 1 to about 25 volume percent.

14. The method defined in claim 1 wherein said deactivated catalyst is contacted with said water for less than about one half hour prior to the wetted catalyst being contacted with said free oxygen-containing gas at said elevated temperature.

15. The method defined in claim 1 wherein said deactivated catalyst is contacted with said water at about ambient temperature.

16. The method defined in claim 1 wherein said deactivated catalyst is a deactivated hydrotreating catalyst containing greater than about 20 weight percent of Group VI B metal components, calculated as the trioxide, on the fresh catalyst basis.

17. The method defined in claim 16 wherein said deactivated catalyst loses less than about 1 weight percent of said Group VIB metal components.

18. The method defined in claim 1 wherein said portion of sulfur deposits removed from said deactivated catalyst is enough to produce a regenerated product catalyst comprising less than about 4.5 weight percent of sulfur, calculated as S.

19. The method defined in claim 18 wherein said deactivated catalyst further comprises carbonaceous deposits and less than about 3 weight percent of said carbonaceous deposits, calculated as C, based on the deactivated catalyst, are removed from said deactivated catalyst.

20. The method defined in claim 19 wherein said carbonaceous deposits removed from said deactivated catalyst comprise less than about 1 weight percent, calculated as C, of said deactivated catalyst.

21. The method defined in claim 1 wherein said deactivated catalyst is a deactivated hydrotreating catalyst containing greater than about 19 weight percent of molybdenum components, calculated as MoO₃, at least about 1 weight percent of nickel components, calculated as NiO, and at least about 0.1 weight percent of phosphorus components, calculated as P, on an amorphous, porous refractory oxide support comprising alumina, said weight percentages calculated on the fresh catalyst basis.

22. The method defined in claim 1 wherein said amount of water is less than the total available pore volume of said deactivated catalyst.

23. The method defined in claim 1 wherein said deactivated catalyst comprises at least about 18 weight percent of catalytic components, calculated as the monoatomic element and on the fresh catalyst basis, supported on an amorphous, porous refractory oxide.

24. The method defined in claim 23 wherein said deactivated catalyst loses less than about 3 weight percent of said catalytic components.

25. The method defined in claim 1 wherein said amount of water is about 5 to about 80 percent of the total available pore volume of said deactivated catalyst.

26. The method defined in claim 1 wherein said deactivated catalyst contains at least one catalytic metal component supported on a porous refractory oxide and less than about 1 weight percent of said catalytic metal component, calculated as the monoatomic element on the fresh catalyst basis, is lost during said method.

27. A method for regenerating a deactivated hydroprocessing catalyst containing sulfur deposits and carbonaceous deposits by contacting the deactivated catalyst with an amount of water less than the total available pore volume of the deactivated catalyst but greater than about 0.5 weight percent of said deactivated catalyst and, subsequently, contacting the deactivated catalyst with a free oxygen-containing gas at an elevated temperature in the range from about 300° F. to about 1050° F. for a time sufficient to concurrently remove a substantial proportion of said sulfur and carboneous deposits from said deactivated catalyst.

28. The method defined in claim 27 wherein said water comprises greater than about 0.5 to less than about 30 weight percent of said deactivated hydroprocessing catalyst.

29. The method defined in claim 27 wherein said deactivated hydrotreating catalyst comprises a catalytic component selected from the group consisting of Group VIB metal components and Group VIII metal components on an amorphous, porous refractory oxide support.

30. The method defined in claim 29 wherein the original catalyst from which said deactivated catalyst is obtained has a pore size distribution including at least about 50 percent of the total pore volume in pores of diameter from about 50 to about 300 angstroms.

31. The method defined in claim 29 wherein the product regenerated hydrotreating catalyst comprises about 20 to about 30 weight percent of said Group VI B metal components, calculated as the trioxide, about 1 to about 8 weight percent of Group VIII metal components, calculated as the monoxide, and further comprises about 0.1 to about 5 weight percent of phosphorus components, calculated as P, on a support comprising gamma alumina, said weight percentages calculated on a fresh catalyst basis.

32. The method defined in claim 31 wherein said Group VIB metal component comprises greater than about 23 weight percent of molybdenum trioxide, said Group VIII metal component comprises greater than about 2 weight percent of nickel oxide, and said phosphorus component comprises greater than about 3.5 weight percent, calculated as P, said weight percentages calculated on a fresh catalyst basis.

33. The method defined in claim 32 wherein said deactivated catalyst loses loses less than one weight percent of said molybdenum or said nickel components.

34. The method defined in claim 27 wherein said water is dispersed form is distributed onto said deactivated hydrotreating catalyst at an ambient temperature and said contacting of the water-treated catalyst with said free oxygen-containing gas is effected with temperature increases in the range from about 50° F. to about 200° F. for holding periods in the range from about 0.01 to about 2 hours and subsequently contacting said hydrotreating catalyst at a temperature in the range from about 650° F. to about 1000° F. for a time sufficient to reduce said carbonaceous deposits on the product hydrotreating catalyst to less than about 1.0 weight percent, calculated as S and C, respectively.

35. The method defined in claim 27 wherein said free oxygen-containing gas has a free oxygen content from about 0.1 to 13 volume percent.

36. The method defined in claim 27 wherein said water comprises about 0.5 to about 20 weight percent of said deactivated catalyst.

37. The method defined in claim 27 wherein said water comprises about 3 to about 17 weight percent of said deactivated catalyst.

38. A method for regenerating a deactivated catalyst containing at least one Group VIB metal component or Group VIII non-noble metal component, sulfur components and carbonaceous deposits supported on a porous refractory oxide, said method comprising contacting said catalyst at a temperature less than about 210° F. and under normal atmospheric pressure with liquid water in an amount from about 0.5 to about 25 weight percent of said catalyst, subsequently, contacting said catalyst with a free oxygen-containing gas at an elevated temperature less than about 750° F. for sufficient time to remove enough sulfur deposits from said catalyst to lower the sulfur content on said catalyst to less than about 4.5 weight percent, calculated as S, and subsequently, contacting said catalyst with a free oxygen-containing gas at a higher temperature than said elevated temperature to combust said carbonaceous deposits from said catalyst to produce a regenerated catalyst having a carbonaceous deposit content of less than about 0.5 weight percent, and a Group VIB metal or Group VIII non-noble metal content, calculated as the monoatomic element, which is less than one weight percent less than that contained on said deactivated catalyst, calculated on a fresh catalyst basis.

39. The method defined in claim 38 wherein said higher temperature is in the range from about 650° F. to about 1000° F. on the surface of said catalyst.

40. The method defined in claim 38 wherein said catalyst is a hydrotreating catalyst containing greater than about 19 weight percent of molybdenum components, calculated at $MoO_3$.

* * * * *